United States Patent [19]

deHertel Eastcott et al.

[11] Patent Number: 4,520,910

[45] Date of Patent: Jun. 4, 1985

[54] GRINDING MILL CONTROL USING CONTROLLED PULSING OF AIR CLUTCHES

[75] Inventors: Peter deHertel Eastcott; Ronald C. Trussler, both of Peterborough, Canada

[73] Assignee: Canadian General Electric Company Limited, Toronto, Canada

[21] Appl. No.: 448,319

[22] Filed: Dec. 9, 1982

[51] Int. Cl.[3] .................... B60K 41/02; F16H 37/06

[52] U.S. Cl. .................... 192/0.02 R; 192/0.098; 192/87.1; 74/661

[58] Field of Search .............. 192/0.076, 0.077, 0.096, 192/0.098, 0.02 R, 87.1, 8 R, 15, 16; 310/76, 78, 92, 95, 97, 100, 101; 74/661, 847

[56] References Cited

U.S. PATENT DOCUMENTS 3,127,790 4/1964 Howey .................... 74/661

3,757,912 9/1973 Ball et al. .................... 74/661

4,298,113 9/1981 Shaver et al. .................... 192/0.094

4,377,222 3/1983 Sommer .................... 74/661

*Primary Examiner*—George H. Krizmanich

*Attorney, Agent, or Firm*—Raymond A. Eckersley

[57] ABSTRACT

There is provided a control apparatus for stopping a large grinding mill driven by two synchronous motors coupled to the mill through respective air clutches. The control includes a clutch actuator control which applies a predetermined amount of pressure of predetermined duration to the clutches sufficient to at least partially close the clutches but insufficient to fully close and lock-up the clutches. The control apparatus further includes an enable control which periodically enables the clutch actuator control to apply the predetermined amount of pressure. The enable control enables the clutch actuator control for a predetermined time duration sufficient to stop motion of the mill and synchronous motors. The present invention provides a system for bringing a mill to a stop relatively quickly without adding significant costs to the mill controls.

6 Claims, 1 Drawing Figure

GRINDING MILL CONTROL USING CONTROLLED PULSING OF AIR CLUTCHES

BACKGROUND OF THE INVENTION

The present invention relates to a system having one or more dynamoelectric machines driving a load. In particular, it relates to a control means for stopping a drive system having a large load driven by one or more synchronous motors.

It is common to drive large loads, such as grinding mills, by having a large diameter ring gear attached to the mill driven by pinions which are in turn mechanically coupled through clutches to one or two synchronous motors. Usually, driving power to the grinding mill is discontinued by open circuiting circuit breakers to cut power to the motors and by releasing the clutches. As a result, separately rotating pieces of equipment, i.e., motors and mill are left coasting. A synchronous motor may take as long as twenty minutes to run down to standstill. The mill normally begins to oscillate and may be in motion for three or four minutes. It is not possible to work on the mill until the mill has stopped oscillating; however, work normally does not begin on the mill until the motors have come also to a standstill so as to ensure the safety of the workers.

It is very desirable to have all moving units come to rest as quickly as possible to reduce the mill shutdown time as well as to reduce the risk of the load freezing in the mill.

One system that overcomes the above disadvantages is disclosed in U.S. Pat. No. 4,298,113 issued Nov. 3, 1981 to Shaver et al. In this patent, a wet clutch is utilized to mechanically couple the synchronous motors with the mill. Further, a brake is provided on the output side of the wet clutches. A distinction should be noted between wet clutches and dry clutches. Wet clutches transmit torque by fluid shear between the mating friction surfaces. The fluid, usually oil, is circulated in a very thin film between the clutch plates which are not in actual sliding contact. The heat is generated in the oil film between the plates and may be removed from the oil by external cooling means. Wet clutches have inherently high thermal capability, and as a result may be allowed to slip continuously without significant wear. Wet clutches are expensive, and tend to be mechanically critical. Conversely, dry clutches, where friction shoes actually rub against the mating clutch surfaces, have limited thermal capacity, cannot stand a significant amount of continuous slipping, are not mechanically critical, are a fraction of the cost of the wet clutch, and as such are widely used in industry. The aforementioned U.S. Patent discloses a method of stopping the mill comprising slowing the mill down until it stops rotating and thereafter slowly lowering the mill so that the load in the mill comes to rest at the bottom dead center position of the mill. To accomplish this, pressure in the wet clutches is reduced with the motors running at synchronous speed to permit the mill to slow until it stops rotating. Thereafter, the wet clutches provide sufficient torque to just balance the force created by the mill load which is held up at an angle. The angle is normally of a considerable size in the order of 55 to 60 degrees. This requires a large amount of heat dissipation because the motors are running at full speed and the torque required by the clutches to balance the load is large, perhaps in the order of 75 percent of full load torque. Clutch pressure is then gradually reduced to its minimum to permit the mill to approach bottom dead center, at which time the brakes are applied to hold the mill. The U.S. Patent further discloses that, if desired, the synchronous motors may then be stopped by disconnecting the power supply to the motors and engaging the clutches periodically to bring the synchronous motors to a stop. The problem with this method is that a significant amount of heat must be dissipated through the clutches. This amount being beyond the capability of dry clutches. Therefore, the type of clutch required to stop the mill quickly is limited to clutches that are able to dissipate large amounts of heat quickly such as wet clutches with external oil coolers. Wet clutches are considerably more expensive and add significant costs to the mill possibly making the purchase of the mill by a customer economically undesirable.

SUMMARY OF THE INVENTION

It is therefore an object of the present invention to provide a control means for quickly stopping the motion of a mill and its synchronous motors which does not have to dissipate large quantities of heat in a concentrated manner through the clutches.

It is a further object of the invention to provide a control means for stopping the motion of a mill regardless of the speed of the mill and motors when the stop is initiated.

Briefly, the present invention provides a control means for stopping the motion of a drive system having a large load driven by one or more dynamoelectric machines coupled to the load through respective clutches. The control means comprises a clutch actuating means and an enabling means. The clutch actuating means applies a predetermined amount of pressure of predetermined duration to the clutches sufficient to at least partially close the clutches but insufficient to fully close and lock-up the clutches. The enabling means periodically enables the clutch actuating means to apply the predetermined amount of pressure until the control means determines that the motion of at least one of the load or dynamoelectric machines ceases. The advantage with the present invention is found in the manner in which the enabling means and clutch actuating means act to dissipate heat through the clutches in a controlled manner so that the heat dissipated is not of such an intensity that would be likely to damage the clutches.

Because heat dissipated through the clutches is controlled, the present invention permits for the use of dry clutches in the preferred application of the present invention; namely, drive systems having a grinding mills driven by two synchronous motors. As can be appreciated, mills utilizing fluid actuated dry clutches are less expensive than mills employing wet clutches.

Another advantage of the present invention is the ability of the control means to slow down the synchronous motors and the mill simultaneously. Because the momentum of the mill and the momentum of the synchronous motors are approximately equal to one another, once one of the mill and synchronous motors has come to a halt, the other should be rotating or oscillating at a considerably reduced speed.

Additionally, the control means may function in response to electric power to the dynamoelectric machines being discontinued.

Preferably, the control means continues to periodically enable the clutch actuating means for a predetermined time duration sufficient to stop motion of both the load and the dynamoelectric machines.

In an alternate embodiment, in the event the motion of the snychronous motors stops prior to the motion of the mill, direct current may be supplied to the stator and rotor windings of the synchronous motors to lock the motors. After this, the periodic enabling the of clutch actuating means will bring the mill to a halt. Alternatively, in the event that the mill has come to rest prior to the synchronous motors coming to rest, direct current is applied to the stator windings of the synchronous motors to bring the synchronous motors to a halt by dynamic braking.

While the present invention contemplates the use of a control means, the invention may be also applicable to a method. Such a method would be for stopping motion of a drive system having a large load driven by one or more dynamoelectric machines coupled to the load through respective clutches. The method would comprise the steps of:

(A) removing the source of electrical driving power to the motors;

(B) applying a predetermined amount of pressure of predetermined duration to the clutches sufficient to at least partially close the clutches but insufficient to fully close and lock-up the clutches; and, (C) periodically continuing the step of applying pressure to the clutches until such time as the motion of at least one of the load and the machines ceases.

Throughout the specification and claims, there is reference to a predetermined amount of pressure of predetermined duration. It should be understood that the predetermined amount of pressure is of sufficient magnitude to cause the clutches to close but insufficient to fully close and lock-up the clutches. The expression "predetermined duration" relates to the length of time during which the clutches will be partially closed. The time duration chosen should not be of sufficient length as to cause the clutches to overheat. Also, reference is made throughout the disclosure and claims to the enabling means. The period of the enabling means should be of sufficient length to allow dissipation of heat from the clutches. Further, the period is preferably a random period, that is the period is not necessarily related to the mill oscillation period, however it can be chosen to either occur on both the normal rotation and backward rotation of the mill, or solely on the backward rotation of the mill.

Normal and backward rotation of the mill occur when the mill starts to oscillate like a pendulum. When the mill is partially coupled to the synchronous motors and the mill is rotating in its normal direction, there may be a slight reduction in the speed of the mill and the synchronous motors because the clutches will not be locked. The major reduction in the speed of the mill and the synchronous motors occurs when the mill is rotating in its backward direction counter to the direction of movement of the dynamoelectric machines. In this event, considerable amounts of heat will be dissipated through the clutches. It is for this latter event, involving large heat generation, that the predetermined duration of the partial closing of the clutches is determined.

BRIEF DESCRIPTION OF THE DRAWING

For a better understanding of the nature and objects of the present invention reference may be had by way of example to the accompanying drawing, designated as FIG. 1, which is a simplified schematic drawing showing the invention.

DETAILED DESCRIPTION OF THE PREFERRED EMBODIMENTS

Figure 1:
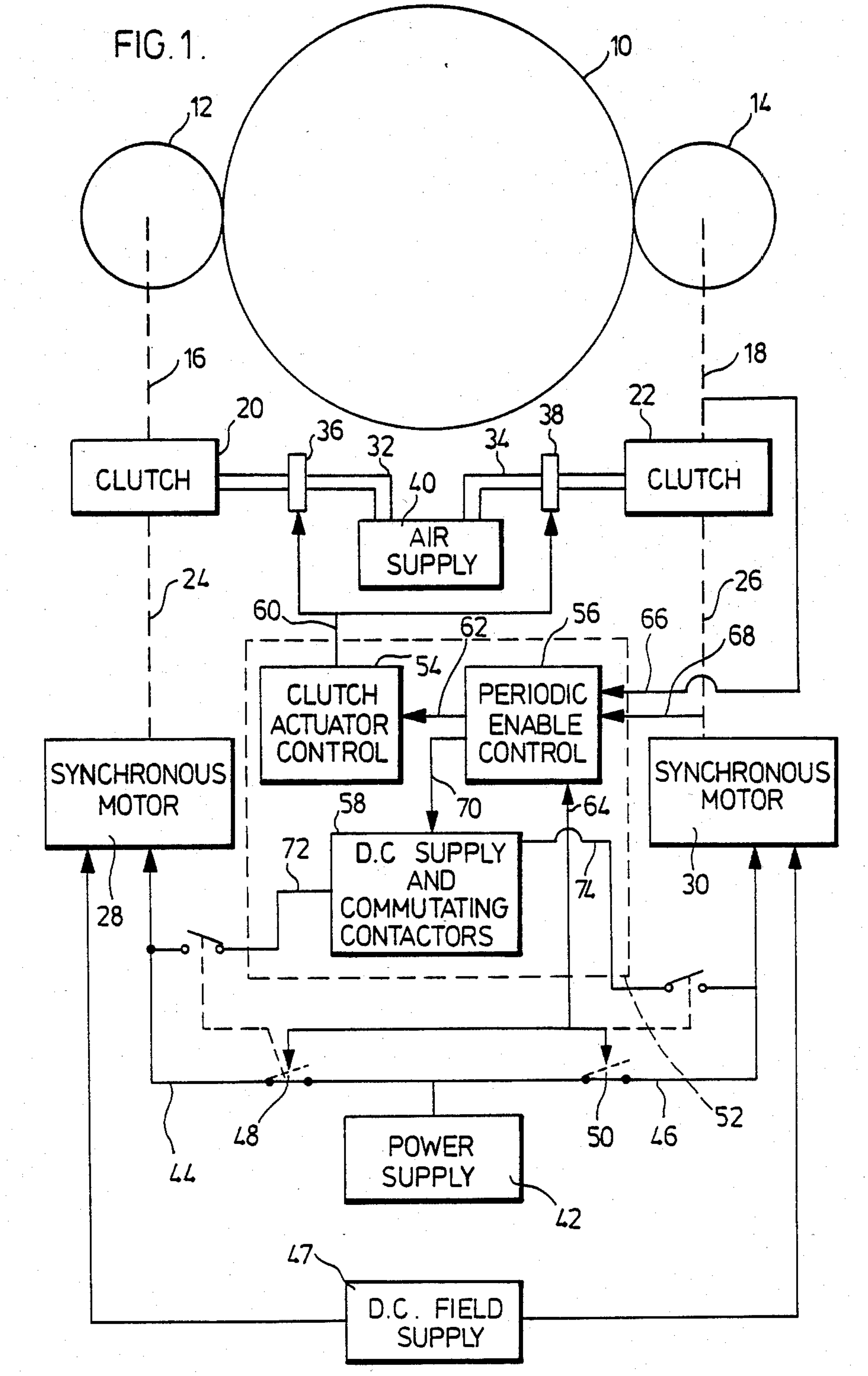

Referring to the drawing, the present invention is described. There is illustrated diagrammatically a large ring gear 10 which is attached to a grinding mill (not shown). The ring gear 10 is driven by two pinions 12 and 14 whose teeth respectively engage the teeth of the ring gear in continuous meshing relation. Two shafts 16 and 18 respectively connect pinions 12 and 14 through air fluid actuated dry clutches 20 and 22 to shafts 24 and 26 of synchronous motors 28 and 30. Operation of clutches 20 and 22 is controlled by air pressure respectively supplied along piping 32 and 34 through pressure valves 36 and 38 from air supply 40. A.C. electrical power is provided to the stators of synchronous motors 28 and 30 from power supply 42. The electrical connection between power supply 42 and synchronous motors 28 and 30 is diagrammatically illustrated by respective power lines 44 and 46. Each power line 44, 46 is provided with a respective circuit breaker 48 and 50, each shown in its closed position. DC power is provided for the fields of motors 28 and 30 from DC supply 47.

In accordance with the present invention there is provided a control means generally illustrated at 52 for stopping the motion of the grinding mill and the synchronous motors 28 and 30 after the driving electrical power is switched off or disscontinued. The control means 52 comprises a clutch actuator means or control 54, an periodic enable means or control 56 and a direct current supply 58 including commutating contactors. As illustrated, circuit breakers 49 on power lines 72, 74 provide DC power from DC suply 58 to stators of motors 28, 30 when breakers 48, 50 are open.

The clutch actuator control is provided with an output line 60 which sends a signal to pressure valves 36 and 38 so as to provide to respective clutches 20 and 22 a predetermined amount of pressure of predetermined duration. Upon the application of the predetermined amount of pressure to clutches 20 and 22, the clutches will at least partially close but will not lock-up. Thus clutches 20 and 22 provide a percentage of full load torque which is employed to slow the mill and the synchronous motors. The clutch actuator control 54 provides a control signal along line 60 is response to an enable signal on line 62 from enable control 56. The enable control 56 generates enable signals in response to a signal on input line 64 indicating interruption of power to the synchronous motors. As illustrated, the enable control is also provided with two other inputs lines 66 and 68 which respectively indicate that the motion of the mill and the motion of the synchronous motors is stopped. The sensing of of either the mill or the synchronous motors stopping is illustrated in the drawings by a sensor which would sense the rotaton of a motor shaft or a pinion shaft. While this sensing is part of the illustrated embodiments, it should be understood that the enable control 56 continues to enable the actuator controller 56 for a predetermined time duration sufficient to stop motion of the grinding mill and synchronous motors 28, 30. This is the simplest manner to stop the mill and motors as it does not involves the use of sensors.

As illustrated, the enable control 56 is further provided with an output line 70 which sends a signal to the direct current power supply 58. In response to receiving a signal, direct current power supply 58 provides direct current to energize the stator windings of synchronous motors 28 and 30. Upon the application of direct current along lines 72 and 74 respectively to the stator windings of synchronous motors 28 and 30, the motors brake dynamically and then lock-up electrically when the rotor filed excitation is applied. This will be useful for example, in the event that the mill stops prior to the synchronous motors stopping. The application of direct current to the stator windings of synchronous motors 28 and 30 will dynamically brake the motors and bring the synchronous motors to rest. In the event that the synchronous motors 28, 30 are the first to stop, the direct current power supply 58 in response to a signal from the enable control 56 supplies direct current power to the synchronous motor stators so as to lock up the motors, and at the same time a signal will be sent along line 62 from the enable control to enable the clutch actuator control to continue to operate the clutches, i.e. pulse the clutches. In this latter event, the clutches in combination with the stopped and locked motor act as a brake to stop the mill. By this means the synchronous motors are only required by to dynamically brake thermselves to rest. The rotational energy of the mill and charge is dissipated as heat in the clutches.

The present invention may also be used to lower the charge from the cascade angle to the position of rest when low speed inching is being used. When the load is at the cascade angle during inching, the motor field windings are fully excited with direct current and the stator is being fed from power supply 58. The motors are now at rest and capable of at least 125% torque. Clutches 20 and 22 may now be pulsed by control 54 through valves 36 and 38 to provide controlled rotational lowering of the mill charge from the cascade angle of perhaps 60 degrees from the vertical to its position of rest at zero degrees.

The foregoing has been a description of the preferred embodiment of the present invention and it should be understood that alternate embodiments may be readily apparent to a man skilled in the art. Accordingly, the scope of the present invention should be limited only to that which is claimed in the accompanying claims.

What we claim as new and desire to secure by Letters Patent of the United States is:

1. A control means for stopping motion of a drive system having a large load driven by one or more dynamoelectric machines powered from an electrical source and coupled to said load through respective dry clutches, said control means comprising clutch actuating means responsive to removal of the electrical source from said machines for applying for a predetermined duration of time a predetermined amount of pressure to said clutches sufficient to at least partially close said clutches but insufficient to fully close and lock-up said clutches, and enabling means for periodically enabling said clutch actuating means to periodically apply said predetermined amount of pressure for said predetermined time duration until the motion of at least one of said load and said dynamoelectric machine ceases.

2. The central means of claim 1, wherein the enabling means ceases to enable said clutch actuating means upon expiration of a predetermined time sufficient to stop motion of said load and said machines.

3. The control means of claim 1 wherein said dynamoelectric machines are synchronous motors having stator and rotor windings and said control means further includes direct current supply means for supply direct current electrical energy to said stator windings to dynamically brake said synchronous motors after motion of said load cease.

4. The control means of claim 1 wherein said dynamoelectric machines comprise synchronous motors having stator and rotor windings and said control means further includes supply means for supplying direct current electrical energy to said stator and rotor windings to lock the rotors at rest after motion of said synchronous motors ceases.

5. A method for stopping motion of a drive system having a large load driven by one or more electric motors coupled to said load through dry clutches, said method comprising the steps of (A) removing the source of electrical driving power from said motors;

(B) applying to said clutches for a predetermined duration of time a predetermined amount of pressure sufficient to patially close said clutches but insufficient to fully close and lock-up said clutches;

(C) continuing to periodically apply to said clutches for said predetermined duration of time said predetermined amount of pressure until the motion of both said load and said motors ceases.

6. The method of claim 5 wherein said electric motors are synchronous motors and further including the step of applying direct current to stator and rotor windings of said synchronous motors to stop and lock said synchronous motors at rest while continuing step C.

* * * * *